United States Patent
Furuna et al.

(10) Patent No.: US 6,517,873 B1
(45) Date of Patent: Feb. 11, 2003

(54) METHOD AND DEVICE FOR STRAIGHTENING UNCOOKED SHRIMP

(76) Inventors: Yuji Furuna, 2400 NW. 139th Ave., Sunrise, FL (US) 33323; Takiko Furuna, 2400 NW. 139th Ave., Sunrise, FL (US) 33323

(*) Notice: Subject to any disclaimer, the term of this patent is extended or adjusted under 35 U.S.C. 154(b) by 0 days.

(21) Appl. No.: 09/734,366

(22) Filed: Dec. 11, 2000

(51) Int. Cl.[7] ............................................. A22C 29/02
(52) U.S. Cl. ................................................... 426/6
(58) Field of Search ........................... 452/2, 1, 6, 17; 30/120.1

(56) References Cited

U.S. PATENT DOCUMENTS

| | | | | |
|---|---|---|---|---|
| 3,110,926 A | * | 11/1963 | Martin | 452/6 |
| 3,331,097 A | * | 7/1967 | Lapeyre | 452/2 |
| 3,609,800 A | * | 10/1971 | Rollband | 452/6 |
| 3,897,610 A | * | 8/1975 | Lapeyre | 452/179 |
| 4,524,490 A | * | 6/1985 | Newville | 452/6 |

* cited by examiner

*Primary Examiner*—Charles T. Jordan
*Assistant Examiner*—Judith A. Nelson
(74) *Attorney, Agent, or Firm*—Gold & Rizvi, P.A.; Glenn E. Gold; H. John Rizvi

(57) ABSTRACT

A shrimp-straightening device provided for use in conjunction with a work surface (32) includes a unitary member (10) having an arcuate geometry defined by an outer surface (12), an inner surface (14), front and rear ends (16, 18), left and right lower edges (20, 22), and a handle (24). In operation, the device is manipulated over the back, or dorsal side, of the shrimp (30) in order to effect straightening of the shrimp.

14 Claims, 3 Drawing Sheets

METHOD AND DEVICE FOR STRAIGHTENING UNCOOKED SHRIMP

FIELD OF THE INVENTION

This invention relates generally to food preparation utensils, and more particularly to an apparatus and method for straightening peeled uncooked shrimp for use in the preparation of a shrimp tempura dish.

BACKGROUND OF THE INVENTION

Shrimp tempura is a well known Japanese food dish which has become popular throughout the world. Basically, shrimp tempura consists of a shrimp coated with a light batter and then deep fried in a heated cooking oil. In contrast to many other types of shrimp dishes, shrimp tempura is unique in that the finally prepared shrimp are presented in a straightened manner. Consequently, it is necessary to remove the naturally-occurring curvature of the shrimp prior to finally preparing the dish. Furthermore, the shrimp must be straightened in a consistent manner which avoids severe tearing, squashing, and other damage to the body and texture of the shrimp. Conventionally, tempura chefs have straightened shrimp by hand. As any tempura chef can attest to, learning to effectively and efficiently straighten uncooked shrimp in this manner requires substantial practice. Consequently, inexperienced tempura chefs are commonly inefficient at preparing this dish and are often responsible for substantial waste due to the necessary discarding of damaged shrimp. Furthermore, even seasoned tempura chefs find the manual shrimp straightening process time-consuming and tedious.

Accordingly, there is a well-established need for an easy-to-use shrimp straightening tool enabling peeled uncooked shrimp to be effectively and efficiently straightened while leaving the body and texture of the shrimp substantially intact for use preparing a shrimp tempura dish. Furthermore, it would be desirable to provide such a tool having a simple design and construction enabling the tool to be cost-effectively manufactured.

SUMMARY OF THE INVENTION

It is an object of the present invention to provide a portable, lightweight device for straightening peeled, uncooked shrimp for use in the preparation of a shrimp tempura dish.

It is another object of the present invention to provide a shrimp straightening device which can be used with minimal instruction and practice to effectively straighten shrimp in a uniform and efficient manner.

In one aspect of the invention, the shrimp-straightening device comprises a resilient member having an arcuate geometry defined by a concave inner surface, a convex outer surface, forward and rear ends, and right and left bottom edges. The lower surface, or inner surface, is sized and shaped for contacting the dorsal side of the shrimp during the shrimp-straightening operation. The main body of the device has a C-shaped horizontal cross section, and is further defined by a longitudinal median line having a smooth continuous convex curvature. A handle member is provided attached to the convex outer surface to enable a user to grip the device and deflect it while pressing against a working surface.

In a second aspect of the invention, the device includes a rigid main body having an arcuate semi-cylindrical geometry particularly designed for being rocked longitudinally against a planar surface during use. The main body is defined by an inner surface, an outer surface, front and rear ends, and left and right lower edges. A gripping means is provided attached to the outer surface and extends upwardly therefrom. The outer surface has a concave shape along its longitudinal median and a convex shape along its horizontal median. The inner surface has a convex shape along its longitudinal median and a concave shape along its horizontal median. In use, the device is rolled back and forth longitudinally to compress the shrimp between the inner surface of the rigid member and the work surface to remove the natural curvature of the shrimp.

In a third aspect of the invention, serrated teeth are provided along a length of at least one of the left and right bottom edges of the main body for use slashing the underside of the shrimp prior to straightening.

In a fourth aspect of the invention, an upper resilient member is provided hingedly attached at its rear end to a lower planar member. A pair of tab members are provided extending vertically upwards from an upper surface of the lower planar member, each tab having an aperture provided therethrough. A pair of pin members are provided inserted through the tab apertures and a corresponding pair of aligned apertures provided in the upper resilient member. In this aspect of the invention, the upper and lower members cooperate in a rotating manner to effect straightening of the shrimp.

In a fifth aspect of the invention, a resilient semi-cylindrical holder is provided having a concave inner surface, a convex outer surface, forward and rear ends, and inwardly extending right and left bottom edges each having an integral lip portion defining a pair of longitudinally extending guide rails. The holder is particularly adapted for slidably receiving corresponding resilient semi-cylindrical insert members sized and shaped for engaging shrimp during the straightening operation.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF THE PREFERRED EMBODIMENTS

Figure 1:
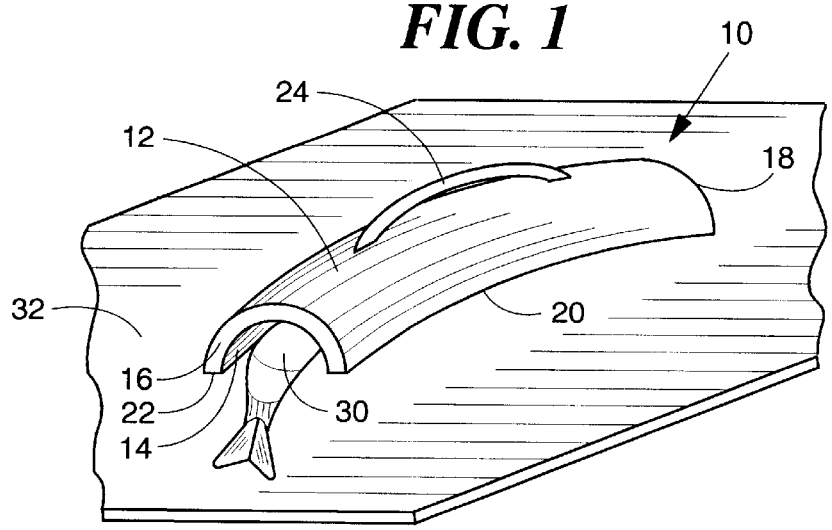
FIG. 1 is a perspective view of a shrimp straightening device in accordance with one aspect of the present invention.
Figure 2:
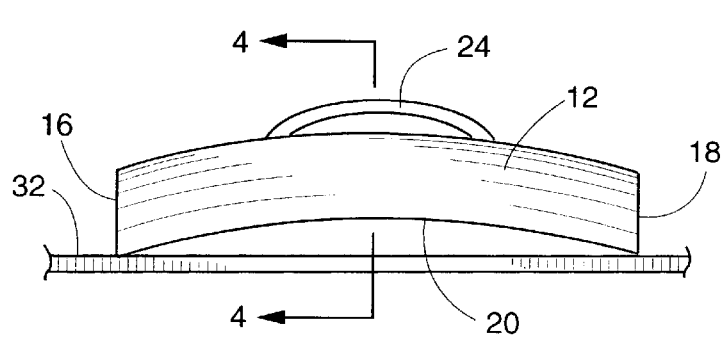
FIG. 2 is a side view of the shrimp straightening device of FIG. 1.
Figure 3:
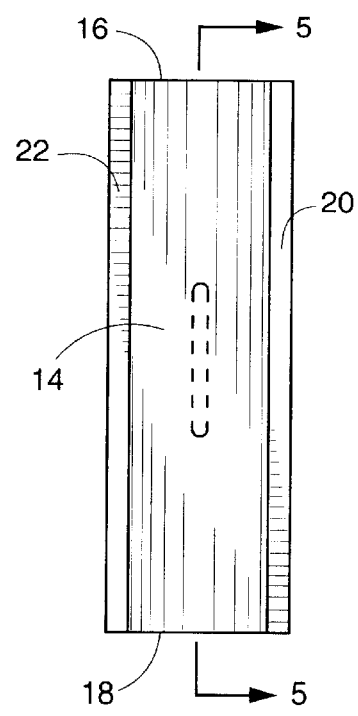
FIG. 3 is a bottom view of the shrimp straightening device of FIG. 1.

Referring now to FIGS. 1–5, in a first embodiment of the present invention a shrimp straightening device is provided for use in conjunction with a planar working surface 32, such as a table or counter top. The shrimp straightening device includes a main body 10 having an arcuate semi-cylindrical geometry defined by convex outer surface 12, concave inner surface 14, rear end 16, front end 18, right bottom edge 20 and left bottom edge 22. A handle member 24 is provided attached to main body outer surface 12 for gripping and manipulating the device during use. Preferably, handle member 24 is integrally molded to outer surface 12 of main body 10.

The inner surface 14 of main body 10 is particularly sized and shaped for engaging the dorsal, or back, portion of shrimp 30 during the straightening operation. Preferably, the inner surface 14 has a smooth finish for enabling the back of the shrimp to slide longitudinally against the inner surface during the straightening operation without damaging its texture. As an alternative to the completely smooth inner surface, frictional enhancement means (not shown) can be incorporated therein to prevent the rotational slipping of the shrimp during the straightening operation. For example, longitudinally extending ribs, or ridges, can be provided running between ends 16 and 18. In this manner, horizontal, or rotational, slipping can be minimized while maintaining minimal friction in the longitudinal direction.

Figure 4:
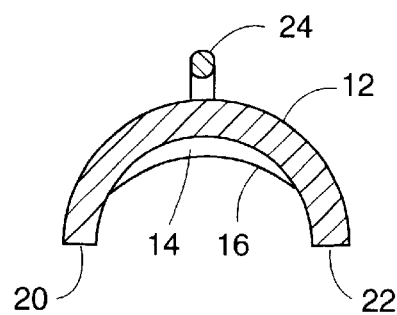
FIG. 4 is a cross-sectional view of the shrimp straightening device of FIG. 1, taken along section line 4—4 of FIG. 2.
Figure 5:
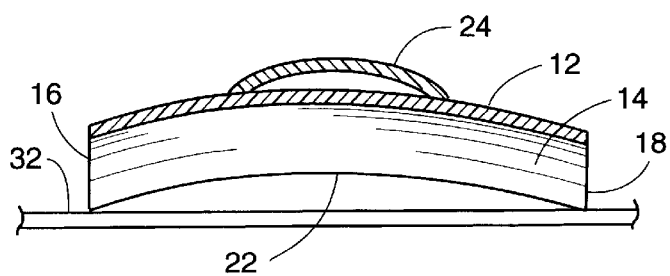
FIG. 5 is a cross-sectional view of the shrimp straightening device of FIG. 1, taken along section line 5—5 of FIG. 3.

As best depicted in FIG. 4, main body 10 has a generally C-shaped horizontal cross section adequately sized to accommodate the width of a shrimp to be straightened. As best depicted in FIG. 5, main body 10 has an arched longitudinal cross section having a curvature corresponding to the natural curvature of a peeled and uncooked shrimp, and a sufficient length to accommodate the length of a shrimp to be straightened.

In this first embodiment of the present invention, shrimp straightening requires the downward deflection of the center portion of the main body 10 of the device in order to compress the shrimp between inner surface 14 of main body 10 and work surface 32. Accordingly, in this embodiment of the invention, the main body 10 of the device is preferably constructed from a material sufficiently resilient to enable its temporary deflection during use. However, the material should also be sufficiently rigid to apply the force necessary to effect permanent deformation of the shrimp during the straightening operation. For example, the main body 10 of the device can be molded from any of a number of plastics having the aforementioned desired properties. Furthermore, as will be apparent to those skilled in the art of manufacturing cooking utensils, the aforementioned desired structural properties can also be attained using non-plastic resilient materials, such as rubbers and the like.

In operation, an uncooked shrimp 30 to be straightened is initially provided peeled with its tail portion intact. The shrimp is positioned within the device with its dorsal side facing upward so as to engage inner surface 14 of body 10. Alternatively, the shrimp can be initially positioned, dorsal side up, on working surface 32 and then covered with the device. While holding the shrimp in place by its tail portion, main body 10 is deflected downward at its center to effectively compress the shrimp between device inner surface 14 and working surface 32. If necessary, this action is repeated until the natural curvature of the shrimp is removed and the shrimp is effectively deformed to the desired straightness.

Referring now to FIGS. 9–12, in a second embodiment of the invention the shrimp straightening device includes a main body having an arcuate semi-cylindrical geometry particularly designed for being rocked longitudinally against a planar surface 32 during use. The main body is defined by outer surface 72, inner surface 74, rear end 76, front end 78, right bottom edge 80 and left bottom edge 82. A handle member 84 is provided attached to main body outer surface 72 for gripping and manipulating the device during use.

Figure 10:
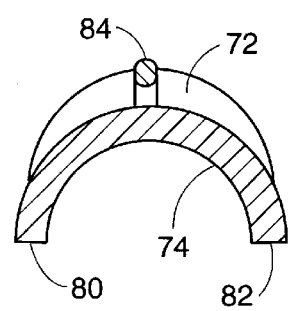
FIG. 10 is a cross-sectional view of the shrimp straightening device of FIG. 9, taken along section line 10—10 of FIG. 9.
Figure 11:
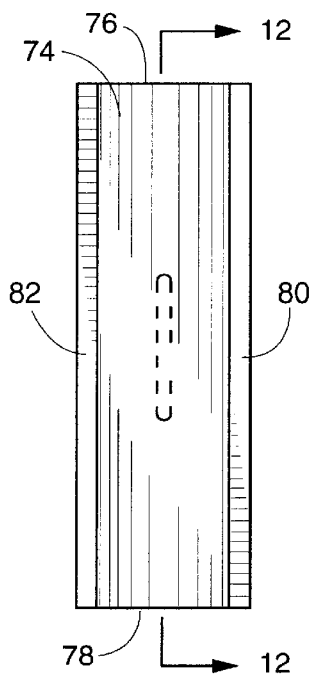
FIG. 11 is a bottom view of the shrimp straightening device of FIG. 9.
Figure 12:
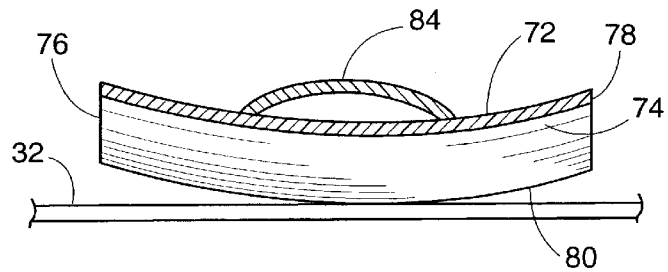
FIG. 12 is a cross-sectional view of the shrimp straightening device of FIG. 9, taken along section line 12—12 of FIG. 11.

As best depicted by FIG. 10 in conjunction with FIG. 12, the geometry of the upper portion of the main body is generally defined by a convex-shaped cross section along its horizontal median and a concave-shaped cross section along its longitudinal median. Accordingly, when viewed in horizontal cross section (as shown in FIG. 10), upper surface 72 has a convex shape and inner surface 74 has a concave shape. Similarly, when viewed in longitudinal cross section (as shown in FIG. 12), upper surface 72 has a concave shape and inner surface 74 has a convex shape.

In operation, the device is positioned above the dorsal side of the shrimp in the same manner as previously described. However, in the present embodiment of the invention the inner surface 74 of the device has a curvature opposite to, or mirroring, the curvature along the dorsal side of the positioned shrimp. Consequently, in the present embodiment of the invention the inner surface 74 only engages a portion of the shrimp at any given time. In operation, the device is rocked back and forth longitudinally against the dorsal side of the shrimp, thereby compressing the shrimp between the inner surface 74 of the device and the work surface 32 until the desired straightening is achieved. In this embodiment of the invention, the main body 70 of the device does not require deflection during use. Accordingly, the device can be constructed from virtually any material having the desired rigidity. However, it is preferred that the main body of the device is molded from an inexpensive, lightweight plastic.

Figure 6:
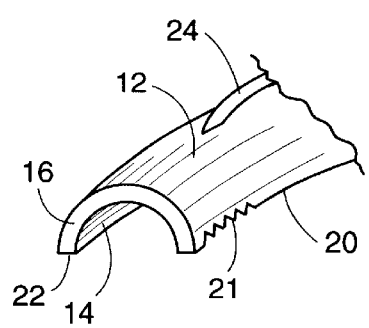
FIG. 6 is a partial perspective view of a shrimp straightening device having a serrated edge portion 21, in accordance with another aspect of the invention.

Referring briefly to FIG. 6, the main body of the device can be provided with integral serrated teeth 21. In FIG. 6, the serrated teeth are illustrated with respect to only the first embodiment of the invention for convenience. Obviously, the serrated teeth can be incorporated into the second embodiment of the invention as well. The serrated teeth are provided along a length of right bottom edge 20. Alternatively, the serrated teeth could be provided on left bottom edge 22. The serrated teeth 21 can be used to introduce one or more cuts into the underside of the shrimp 30 prior to the straightening operation. Such cuts are commonly employed to weaken the natural bend in the shrimp, thereby facilitating straightening and reducing the potential for introducing undesirable tears in the dorsal portion of the shrimp.

Figure 7A:
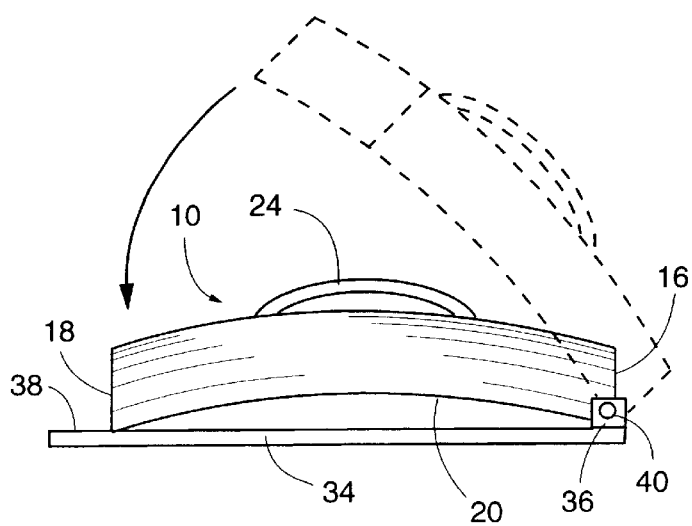
FIG. 7A is side view of a shrimp straightening device having a hinged two-part construction, in accordance with another aspect of the present invention.
Figure 7B:
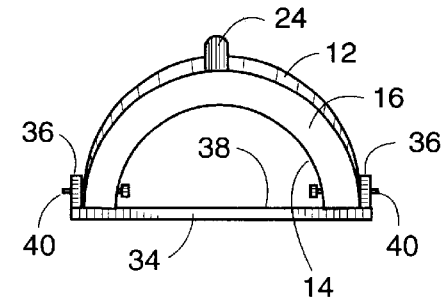
FIG. 7B is an end view of the shrimp straightening device depicted in FIG. 7A.

Referring now to FIGS. 7A and 7B, in a third embodiment of the present invention, main body 10 is attached at its rear end 16 to a lower planar member 34 by a hinge. In particular, hinge members 40 are provided extending through aligned apertures (not shown) in main body 10 and tab portions 36 of lower planar member 34. In FIG. 7A, main body 10 is shown in phantom in an opened positioned to illustrate the operation of the device. In use, a peeled uncooked shrimp (not shown) is positioned within the device dorsal side up with its tail proximate to end 16. Subsequently, main body 10 and lower planar member 34 are brought together in a rotating manner to effectively compress the shrimp between surfaces 14 and 38, thereby removing the natural curvature of the shrimp.

Figure 8:
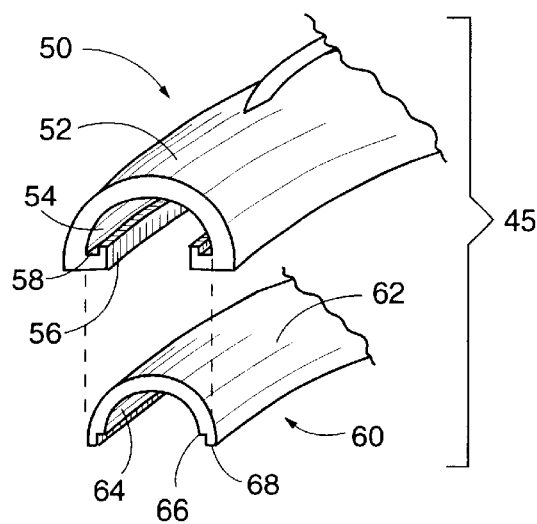
FIG. 8 is a partial perspective view of a shrimp straightening device 45 incorporating a holder 50 and an insert member 60, in accordance with another aspect of the invention.
Figure 9:
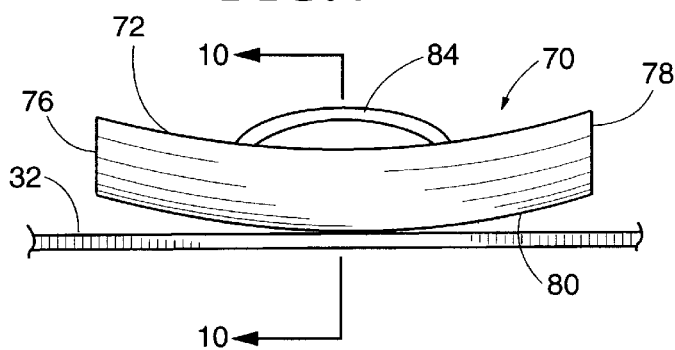
FIG. 9 is a side view of a shrimp straightening device in accordance with a further aspect of the invention.

Referring now to FIG. 8, in a fourth embodiment of the invention, a shrimp straightening apparatus 45 includes a holding member 50 and an insert member 60. The holder is sized and shaped for slidably receiving insert member 60 in such a manner that, upon insertion, inner surface 54 of holder 50 frictionally engages outer surface 62 of insert member 60. Holder 50 is provided with integral rails along its longitudinal edges generally defined by horizontal surface 58 and vertical lip 56. The longitudinal edges of insert member 60 have a stepped geometry, defined by recessed interior edge 66 and leading outer edge 68, sized for being slidably received within the aforementioned rails. Apparatus 45 functions in a manner similar to that previously described with respect to the first embodiment of the invention.

The shrimp straightening devices and methods of the present invention provide a number of significant advantages vis-a-vis conventional shrimp straightening techniques. In particular, the simplicity and ease of use of the devices enable users to straighten uncooked shrimp in a uniform manner, with minimal effort, and little or no resulting waste. Furthermore, the devices have a simple design and construction. Consequently, the shrimp-straightening tools of the present invention are amenable to being cost-effectively manufactured for use by even the most inexperienced tempura chefs and cooks.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims. For example, a main body having a non-continuous multi-sided geometry could be employed in lieu of the preferred smooth, semi-cylindrical geometry.

We claim:

1. A shrimp-straightening device for use in conjunction with a work surface, comprising:
    a unitary resilient member having an arcuate geometry defined by an inner surface having a concave curvature both longitudinally and transverse to the longitudinal axis, a convex outer surface, forward and rear ends, and right and left bottom edges; and
    a handle member attached to said convex outer surface and extending upwardly therefrom;
    said concave inner surface sized and shaped for engaging the curved dorsal side of said shrimp during said shrimp-straightening operation.

2. A shrimp-straightening device as recited in claim 1, wherein said resilient member has a generally C-shaped horizontal cross section.

3. A shrimp-straightening device as recited in claim 1, wherein the arcuate geometry of said resilient member is further defined by a longitudinal cross section having a smooth continuous curvature.

4. A shrimp-straightening device as recited in claim 1, wherein said handle member is integrally attached to said resilient member.

5. A shrimp-straightening device as recited in claim 1, further comprising an integral cutting means provided along a length of at least one of said left and right bottom edges.

6. A shrimp-straightening device as recited in claim 5, wherein said integral cutting means further comprise a plurality of serrated teeth.

7. A shrimp-straightening device for use in conjunction with a work surface, comprising:
    a unitary rigid member having an arcuate geometry defined by an inner surface, an outer surface, front and rear ends, and left and right lower edges; and
    a handle member attached to said outer surface and extending upwardly therefrom;
    said outer surface having a concave curvature along its longitudinal median and a convex curvature along its horizontal median;
    said inner surface having a convex curvature along its longitudinal median and a concave curvature along its horizontal median, wherein
        during use, said device is rolled back and forth longitudinally to compress the shrimp between the inner surface of said rigid member and the work surface to remove the natural curvature of the shrimp.

8. A shrimp-straightening device as recited in claim 7, wherein said unitary rigid member has a generally C-shaped horizontal cross section.

9. A shrimp-straightening device as recited in claim 7, wherein the arcuate geometry of said resilient member is further defined by a longitudinal cross section having a smooth continuous curvature.

10. A shrimp-straightening device as recited in claim 7, wherein said handle member is integrally attached to said unitary rigid member.

11. A shrimp-straightening device as recited in claim 7, further comprising an integral cutting means provided along a length of at least one of said left and right bottom edges.

12. A shrimp-straightening device as recited in claim 11, wherein said integral cutting means further comprise a plurality of serrated teeth.

13. A method for straightening a shrimp using a shrimp-straightening device, the device including a rigid member having an arcuate geometry defined by an inner surface, an outer surface, front and rear ends, and left and right lower edges, and a handle member attached to an outer surface and extending outwardly therefrom, the method comprising the steps of:
    providing a peeled shrimp having its tail portion attached;
    positioning said shrimp on a work surface with its dorsal side facing upwards;
    placing said rigid member over said shrimp such that at least a portion of the inner surface of said rigid member contacts the dorsal side of said shrimp; and
    rocking said rigid member back and forth longitudinally over said shrimp to compress said shrimp between said rigid member and said work surface to effect said straightening.

14. A method as recited in claim 13, wherein the step of positioning said shrimp on a work surface further comprises maintaining the shrimp against the work surface by gripping its tail portion.

* * * * *